United States Patent
Effenberger

(10) Patent No.: US 10,080,401 B2
(45) Date of Patent: Sep. 25, 2018

(54) ILLUMINATED SEAT BELT BUCKLE

(71) Applicant: Volkswagen Aktiengesellschaft, Wolfsburg (DE)

(72) Inventor: Witali Effenberger, Wendeburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 15/626,659

(22) Filed: Jun. 19, 2017

(65) Prior Publication Data

US 2017/0280830 A1 Oct. 5, 2017

Related U.S. Application Data

(63) Continuation of application No. PCT/EP2015/080144, filed on Dec. 17, 2015.

(30) Foreign Application Priority Data

Dec. 19, 2014 (DE) .................. 10 2014 226 587
Apr. 14, 2015 (DE) .................. 10 2015 206 602

(51) Int. Cl.
| | | |
|---|---|---|
| B60Q 3/242 | (2017.01) | |
| A44B 11/25 | (2006.01) | |
| B60Q 3/80 | (2017.01) | |
| B60Q 3/70 | (2017.01) | |
| B60Q 3/60 | (2017.01) | |

(52) U.S. Cl.
CPC .......... *A44B 11/2565* (2013.01); *B60Q 3/242* (2017.02); *B60Q 3/60* (2017.02); *B60Q 3/70* (2017.02); *B60Q 3/80* (2017.02)

(58) Field of Classification Search
CPC . B60Q 3/242; B60Q 3/60; B60Q 3/70; B60Q 3/80; A45B 11/2565
See application file for complete search history.

(56) References Cited

U.S. PATENT DOCUMENTS

| | | |
|---|---|---|
| 3,568,268 A | 3/1971 | Cunningham |
| 4,237,586 A | 12/1980 | Morinaga |
| 5,149,189 A | 9/1992 | Kawamura |
| 5,892,436 A | 4/1999 | Blackburn et al. |
| 2007/0236917 A1 | 10/2007 | Gray et al. |
| 2012/0089302 A1 | 4/2012 | Griffin |

(Continued)

FOREIGN PATENT DOCUMENTS

| | | |
|---|---|---|
| DE | 20 2004 007 872 U1 | 10/2004 |
| DE | 10 2009 047 937 | 4/2011 |

(Continued)

OTHER PUBLICATIONS

Korean Office Action for Korean Application No. 10-2017-7017403 dated Jun. 4, 2018 with English translation.

*Primary Examiner* — Thomas M Sember
(74) *Attorney, Agent, or Firm* — Muncy, Geissler, Olds & Lowe, P.C.

(57) ABSTRACT

An illuminated seat belt buckle for a seat belt. The seat belt buckle has a buckle housing, a locking mechanism, an insertion slot for a belt latch of the seat belt, an actuating button for release purposes, and an illuminating device which has at least one light source and is arranged in the seat belt buckle. The buckle housing has a light-permeable and annularly closed light outlet opening from which the coupled-in light provided by the illuminating device emerges. The light outlet opening surrounds the actuating button and/or the insertion slot in an encircling manner.

16 Claims, 3 Drawing Sheets

(56) References Cited

U.S. PATENT DOCUMENTS

| | | |
|---|---|---|
| 2012/0188778 A1 | 7/2012 | Buettner et al. |
| 2014/0268844 A1 | 9/2014 | Knoedl |
| 2017/0127765 A1 | 5/2017 | Betz et al. |

FOREIGN PATENT DOCUMENTS

| | | |
|---|---|---|
| DE | 10 2011 114 538 A1 | 4/2013 |
| EP | 1 723 867 A1 | 11/2006 |
| GB | 2 244 085 A | 11/1991 |
| WO | WO 2016/008585 A1 | 1/2016 |

ILLUMINATED SEAT BELT BUCKLE

This nonprovisional application is a continuation of International Application No. PCT/EP2015/080144, which was filed on Dec. 17, 2015, and which claims priority to German Patent Application No. 10 2014 226 587.8, which was filed in Germany on Dec. 19, 2014, and German Patent Application No. 10 2015 206 602.9, which was filed in Germany on Apr. 14, 2015, and which are all herein incorporated by reference.

BACKGROUND OF THE INVENTION

Field of the Invention

The invention relates to an illuminated seat belt buckle for a seat belt, in particular of a motor vehicle, comprising a buckle housing, a locking mechanism, an insertion slot for a belt latch of the seat belt, an actuating button for release purposes and comprising an illuminating device which has at least one light source and is arranged in the buckle housing.

Description of the Background Art

A seat belt provided for restraining the body of a vehicle occupant is usually fastened by inserting a belt latch connected to the seat belt into an insertion slot of a seat belt buckle and locking it in the seat belt buckle with the aid of a locking mechanism. An actuating button is provided on the belt buckle for release purposes. In the dark, it is difficult for the vehicle occupant to locate the insertion slot of the seat belt buckle in order to insert the belt latch into the seat belt buckle. For this reason, different approaches have already been proposed, in which an illuminating device is built into the seat belt buckle so that the insertion slot of the seat belt buckle accommodating the belt latch is illuminated in the dark.

For example, a seat belt buckle having an illuminating device for locating the insertion slot for the belt latch is already known from DE 10 2011 114 538 A1, which corresponds to U.S. 20140268844. The illuminating device arranged in the buckle housing comprises a light source and a light conductor. The light conductor, which receives and distributes the light generated by the light source, is arranged in the insertion slot in such a way that a reflecting surface on the front of the light conductor terminates flush with the buckle housing. The reflecting surface of the light conductor is thus visibly arranged in the insertion slot of the seat belt buckle. The light conductor runs from the front reflecting surface in the direction of the light source in a wedge-like manner.

It has proven to be disadvantageous that the illuminating device comprising the light source and the light conductor is arranged directly in the area of the seat belt buckle, into which the belt latch is to be inserted. Damage to the illuminating device may thereby occur when the belt latch is inserted into the seat belt buckle. The arrangement of the reflecting surface of the light conductor, visible to the vehicle passenger, results in a direct, inhomogeneous and not particularly high quality illumination of the insertion slot. Moreover, due to the arrangement of the light conductor and the light source in the area of the insertion slot, the interior of the seat belt buckle is also illuminated, so that the vehicle occupant is able to see the details of the locking mechanism, including any dirt that may be present in the buckle interior. Additional installation space, which is already in short supply, in particular in the area of the insertion slot, must also be made available for the illuminating device. When the belt latch is situated and locked in the seat belt buckle, the light conductor of the illuminating device is almost completed covered by the belt latch itself and by the seat belt connected to the belt latch, so that the reflecting surface of the light conductor is not visible to the vehicle occupant. The illuminating device is therefore used exclusively to locate the seat belt buckle during an insertion of the belt latch but not to locate the seat belt buckle or the actuating button when releasing the belt latch.

SUMMARY OF THE INVENTION

It is therefore an object of the invention is to provide a high quality, homogeneous illumination for a seat belt buckle, which makes it easier to use the seat belt buckle in the dark.

According to an exemplary embodiment of the invention, an illuminated seat belt buckle for a seat belt is thus provided, in which the buckle housing has a light-permeable and annularly closed light outlet opening, from which the coupled-in light provided by the illuminating device emerges and which circumferentially surrounds the actuating button and/or the insertion slot. Due to the annularly closed light outlet opening, an optically high quality and homogeneously illuminated seat belt buckle is provided, and an indirect illumination of the insertion slot and the actuating button is ensured in the dark. The use of the seat belt buckle in the dark is made easier, in particular, in that the insertion slot and the actuating button are completely surrounded by the annular light outlet opening. The location of the insertion slot during the insertion of the belt latch into the seat belt buckle as well as the location of the actuating button for the release operation are both ensured hereby.

An embodiment provides that the buckle housing includes an annularly closed cover shell, which is arranged on the end face and has an opening for the actuating button and/or the insertion slot, the light outlet opening being arranged in the cover shell. The buckle housing of seat belt buckles usually comprise at least two joined housing shells, so that the end face of the seat belt buckle, in which the insertion slot and the actuating button are arranged, inevitably also has a visible and haptically perceivable separating surface or groove. The seat belt buckle according to the invention now no longer has a visible and haptically perceivable separating surface or groove, due to the annularly closed cover shell. In addition, the mechanical load tolerance of the buckle housing or the seat belt buckle is improved hereby, compared to the two-part seat belt buckles customarily used. Due to the arrangement of the likewise annularly formed light outlet surface in the cover shell, a uniform light emergence and an annularly closed light line, which is guided around the insertion slot and the actuating button, are generated.

The cover shell may be made from the same material as the buckle housing. The buckle housings of seat belt buckles are usually made from an injection-moldable, hard plastic. However, a material that differs from that of the buckle housing may also be used. It is also conceivable for the cover shell to have a different color or a different surface structure than the buckle housing. For example, the cover shell may be matched to the color or the material of the particular interior trim of the vehicle. Of course, the cover shell and/or the buckle housing may also be provided with a decorative layer, made, for example, from leather, artificial leather, plastic, textile fabric, carbon fiber fabric, paint or metal.

In an embodiment, the cover shell can be detachably connected to the buckle housing. This facilitates the assembly and disassembly of the seat belt buckle and also ensures a replacement of defective seat belt buckle components.

In an embodiment, the light outlet opening can be formed by a light-diffusing element arranged in the cover shell. Due to the light-diffusing element, a coupled-in light generated by the light source is evenly distributed, so that a homogeneous illumination of the seat belt buckle may be ensured in the dark.

To prevent an unintentional detachment of the light-diffusing element from the cover shell, in particular under an external mechanical load, it is provided that the light-diffusing element and the cover shell are connected to each other in a form-fitting or integral manner. The fixing may take place, for example, by means of a latched connection or by means of an adhesive connection.

However, an embodiment according to which the light-diffusing element and the cover shell are formed as a single piece is particularly advantageous. The light-permeable light-diffusing element may be injection-molded directly onto the cover shell, for example by means of a two-component injection molding method.

The light source of the illuminating device can be formed by at least one LED (light-emitting diode) or an LED module. An LED, including its circuit board, requires comparatively little installation space, so that the illumination of the seat belt buckle does not affect the structural design of the other seat belt buckle components, in particular the locking mechanism. In addition to the minimal requirements, an LED also offers the advantage that it is very robust and has little susceptibility to faults. The LED or the LED module is preferably activated via a LIN processor (LIN—local interconnect network), which may be situated on the circuit board together with the LED.

According to an embodiment the invention, it is furthermore provided that the illuminating device can include a light conductor, which receives the light emerging from the light source and couples it into the light outlet opening. A light generated by a single comparatively small light source may be distributed hereby in such a way that a comparatively large area may be well illuminated. Moreover, the light is conducted through the light conductor at the points in the seat belt buckle which are to be illuminated, while the light source, including the cables, may be arranged at the points in the seat belt buckle where corresponding installation space is available for the purpose of arrangement or fixing as well as for wiring.

An advantageous embodiment of the present invention is also achieved in that the light conductor and the light source comprising a circuit board and at least one LED form an integral structural unit. This ensures that the LED is arranged in the necessary position and location relative to a coupling-in section of the light conductor after the structural unit is mounted in the buckle housing. The mounting of the light source and the light conductor in the seat belt buckle is also simplified, and a separate housing for the circuit board or light source may be dispensed with. The function of the housing of the circuit board, in particular protection against dust and water, is then ensures by the buckle housing of the seat belt buckle itself.

An especially homogeneous illumination of the seat belt buckle is also achieved in that the light conductor has an annularly closed ring section, which is arranged congruently with the annular light outlet opening. This ensures that the light distributed by the light conductor is uniformly coupled into the light outlet opening.

This effect is also supported in that the ring section of the light conductor at least partially abuts a back side of the light-diffusing element facing away from the visible side and/or a back side of the cover shell facing away from the visible side. As a result, the light-radiating light conductor is arranged in the direct vicinity of the light outlet opening in the cover shell.

It may also be provided that the ring section of the light conductor is injection-molded onto the light-diffusing element or the cover shell. The injection molding may take place, for example, by means of a two-component injection molding method. The fact that the ring section of the light conductor is injection-molded onto the light-diffusing element or an adjacent area of the cover shell ensures that the ring section of the light conductor is arranged in a defined position relative to the light outlet opening. An additional fixing of the light conductor is unnecessary, whereby the assembly of the seat belt buckle is essentially simplified.

Another feature according to an embodiment of the invention is that the light conductor can have a light deflecting structure, at least in sections, on an underside facing away from the light outlet opening. The structure, which is assembled, for example, from multiple prisms, ensures that the light coupled into the light conductor from the light source or LED is deflected in a targeted manner in a desired light radiation direction, namely through the light outlet opening.

An illumination of the locking mechanism and an uncontrolled and undesirable emission of light through the insertion slot is also prevented in that a light-impermeable partition wall is provided, at least in sections, between the light source and the locking mechanism and/or between the light conductor and the locking mechanism.

The light source can be arranged and fixed between the partition wall and the buckle housing, and the ring section of the light conductor is arranged and fixed between the partition wall and the cover shell. The partition wall thus acts as a light barrier between the light-radiator and the locking mechanism, on the one hand, and simultaneously ensures a process-secure fixing within the seat belt buckle or within the buckle housing, on the other hand.

It has proven to be particularly advantageous, in particular for assembling and disassembling the seat belt buckle, that the partition wall can be connected to form a single piece with the cover shell or the buckle housing. A passage of light beams between the partition wall and the particular carrier part is effectively prevented hereby.

Thus, a seat belt buckle may be provided by the invention, which meets the high quality and economical as well as safety requirements in the automotive industry. Due to the annular light outlet opening, an illumination ring or a light line is generated, whose geometry is adaptable according to the design of the particular seat belt buckle. The illumination of the seat belt buckle may be activated in interaction with all functions and illumination variations within the particular vehicle.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
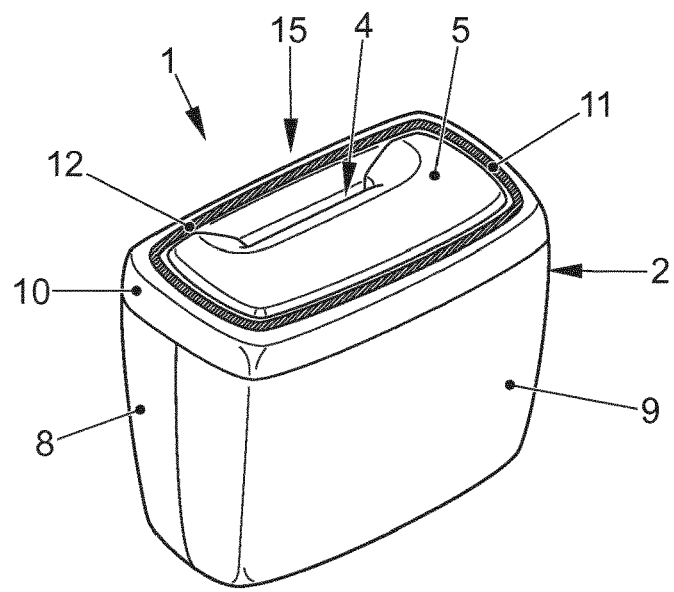
FIG. 1 shows a perspective representation of an illuminated seat belt buckle.
Figure 2:
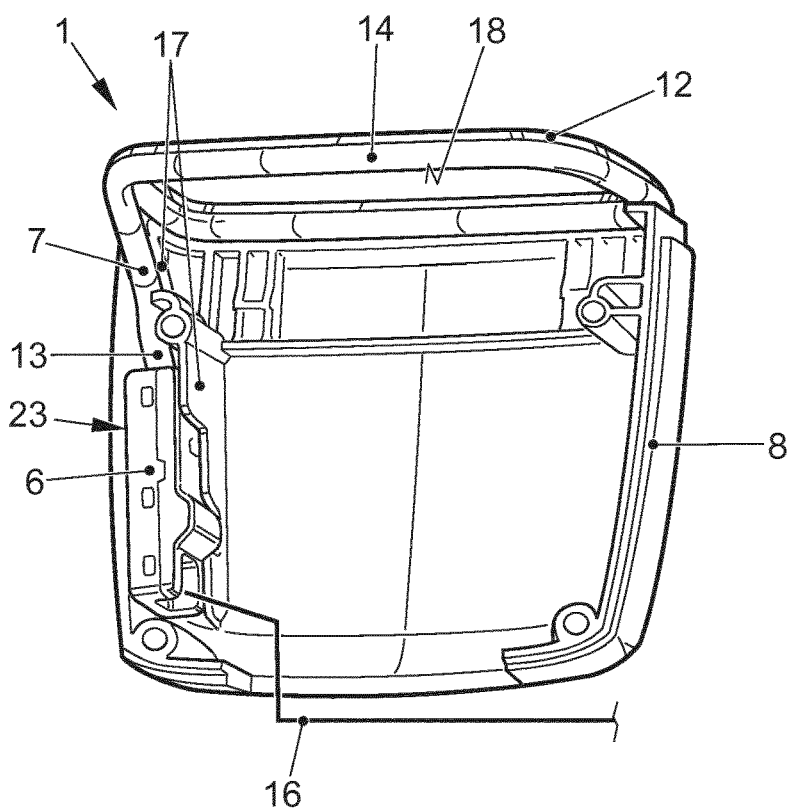
FIG. 2 shows an opened seat belt buckle without a locking mechanism and cover shell in a different perspective view that than the one in FIG. 1.
Figure 3:
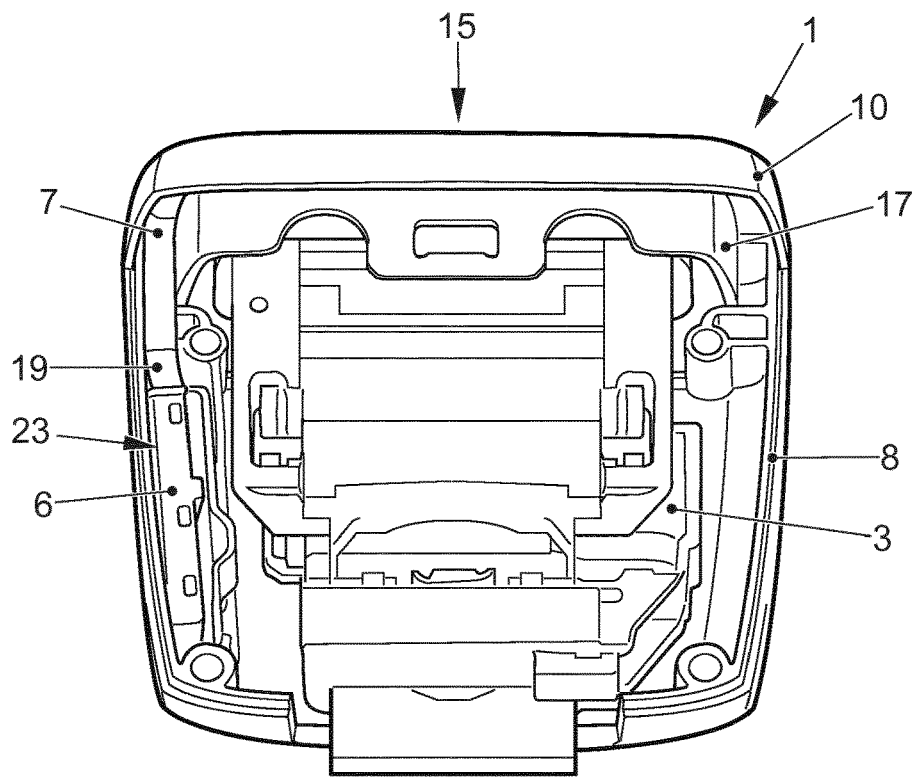
FIG. 3 shows a side view of an opened seat belt buckle, including the locking mechanism and cover shell.

Illuminated seat belt buckle 1 illustrated in FIGS. 1 through 3 includes a buckle housing 2, in which a locking mechanism 3 is arranged, which is apparent in FIG. 3. Locking mechanism 3 is used to receive and lock a belt latch of a seat belt, which is insertable through an insertion slot 4 in buckle housing 2 and is not illustrated in the figures. The locking action takes place automatically when the belt latch is inserted into locking mechanism 3. An actuating button 5 is provided for release purposes. If a pressure force is manually applied to actuating button 5, the locked state is released, and the belt latch is ejected from locking mechanism 3.

An illuminating device, which comprises a light source 6, designed as an LED circuit board or LED module, and a light conductor 7 made from plastic, for example PMMA (polymethyl acrylate) (FIG. 2), is also arranged in buckle housing 2 for the purpose of illuminated seat belt buckle 1. As illustrated in FIGS. 2 and 3, light source 6 may include an additional housing 23 within buckle housing 2. However, this additional housing 23 is not absolutely necessary.

Figure 4:
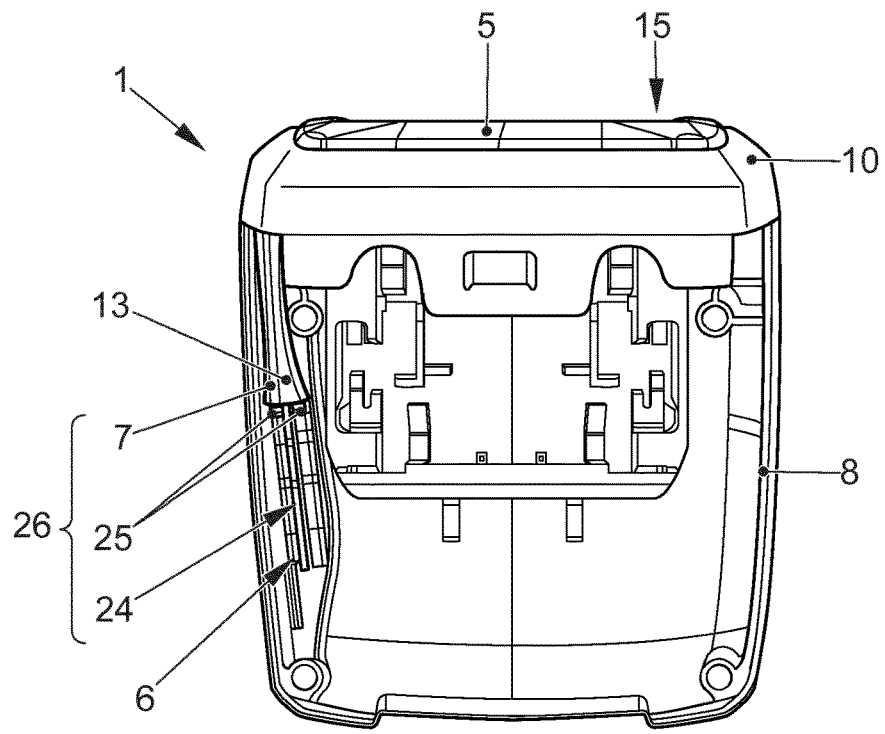
FIG. 4 shows a second specific embodiment of a seat belt buckle in a view according to FIG. 3.
Figure 5:
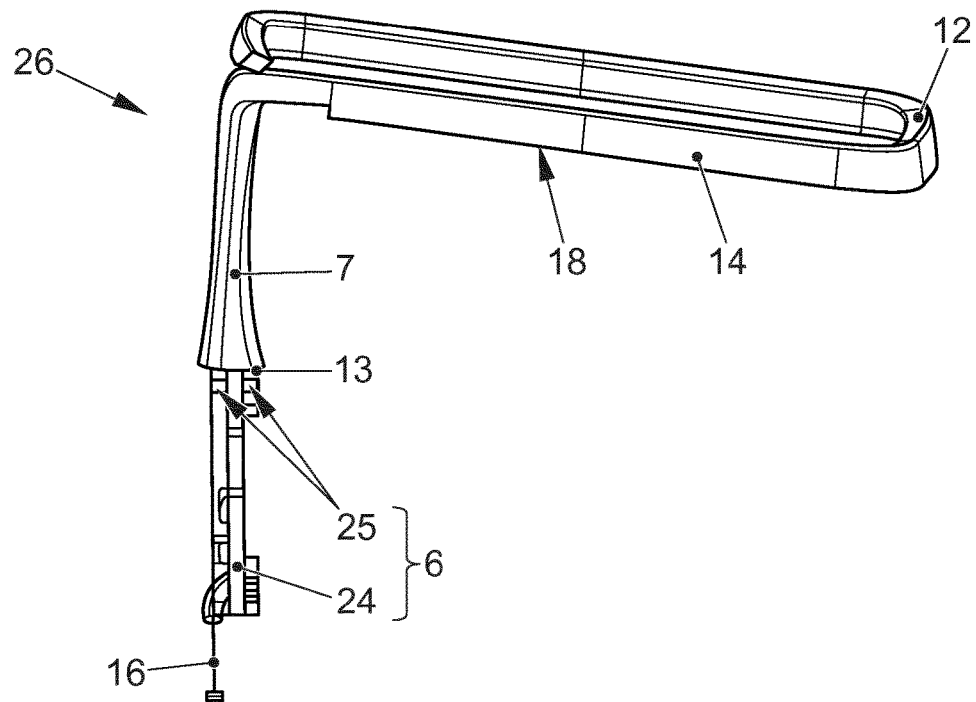
FIG. 5 shows a perspective representative of an integral structural unit illustrated in FIG. 4 and comprising a light conductor and a light source.

FIG. 4 shows one specific embodiment of seat belt buckle 1, in which a housing 23 of this type for light source 6 is dispensed with. Light source 6, comprising a circuit board 24 and two LEDs 25 arranged on circuit board 24, and light conductor 7 form a jointly handled, integral structural unit 26, which is also illustrated in FIG. 5. Circuit board 24 thus does not have a separate housing 23 but is fixed directly on buckle housing 2 and/or is positioned in buckle housing 2 by the fixing of light conductor 7 or structural unit 26. In this specific embodiment of seat belt buckle 1, a dust and water protection of circuit board 24 is ensured by a correspondingly adapted buckle housing 2.

As is apparent, in particular, in FIG. 1, buckle housing 2 has a three-part structure and comprises two interconnected housing shells 8, 9 and an annularly closed cover shell 10 connected to the two housing shells 8, 9. The connection between the two housing shells 8, 9 and cover shell 10 may take place, for example, by a detachable latched connection. Annularly closed cover shell 10 forms an end face of seat belt buckle 1 or buckle housing 2 and has an opening for actuating button 5 and insertion slot 4. A light-permeable and annularly closed light outlet opening 11 is also provided in cover shell 10, from which the light provided by the illuminating device emerges. Annular light outlet opening 11 surrounds the entire circumference of both actuating button 5 and insertion slot 4. Light outlet opening 11 is formed by a light-diffusing element 12, which is apparent in FIG. 2 and is made, in particular, of plastic and which is introduced into cover shell 10.

To ensure a homogeneous illumination of seat belt buckle 1, the light provided by light source 6 is coupled into light conductor 7 and uniformly distributed thereby. For this purpose, light conductor 7 has a coupling-in section 13 assigned to light source 6 and a ring section 14 (see FIG. 2) assigned to light outlet opening 11. Ring section 14 is arranged congruently and concentrically to annular light outlet opening 11 on a back side of cover shell 10 facing away from a visible side 15 in the direct vicinity of light outlet opening 11.

Light source 6 designed as an LED circuit board or LED module is supplied with electrical current through a line 16 indicated in FIG. 2 and/or activated by a processor, which may be integrated. To prevent an undesirable emergence of light from seat belt buckle 1 through locking mechanism 3 or insertion slot 4, light-impermeable partition walls 17, which are arranged between locking mechanism 3 and light source 6 or light conductor 7, are assigned to light source 6 and light conductor 7. Ring section 14 of light conductor 7 s arranged and fixed between cover shell 10 and partition wall 17, which is connected to cover shell 10 to form a single piece, while light source 6 is situated and fixed between an outer wall of one housing half 8, 9 and a partition wall 17 connected to housing half 8, 9 to form a single piece.

Figure 6:
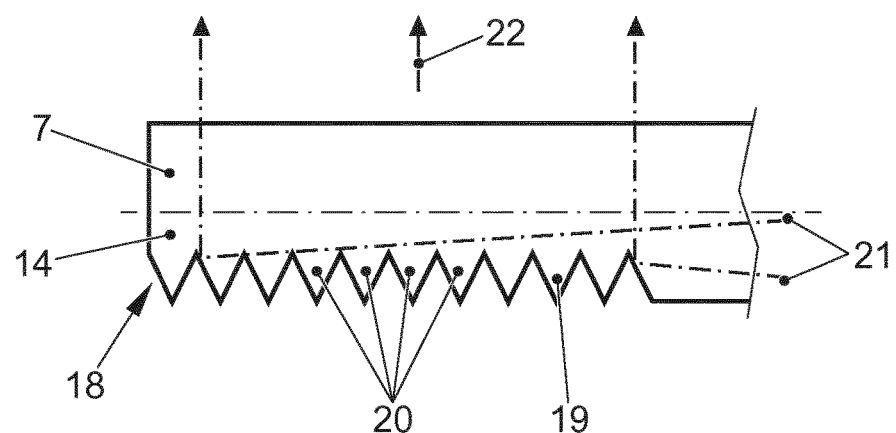
FIG. 6 shows a light conductor, including a light-deflecting structure.

As is apparent in FIG. 6, light conductor 7, in particular ring structure 14, has a light-deflecting structure 19 on an underside 18 facing away from light outlet opening 11. Structure 19 comprises multiple prisms 20 and ensures that light beams 21 coupled into light conductor 7 from light source 6 or LEDs 25 and striking a prism 20 are deflected in a targeted manner in a desired light radiation direction 22, namely through light outlet opening 11, which is not illustrated in FIG. 4.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An illuminated seat belt buckle for a seat belt, the illuminated seat belt buckle comprising:
   a buckle housing;
   a locking mechanism;
   an insertion slot for a belt latch of the seat belt;
   an actuating button for releasing the illuminated seat belt buckle; and
   an illuminating device that has at least one light source and is arranged in the illuminated seat belt buckle,
   wherein the buckle housing has a light-permeable and annularly closed light outlet opening from which the coupled-in light provided by the illuminating device emerges and which circumferentially surrounds the actuating button and/or the insertion slot,
   wherein the buckle housing includes side walls that form side surfaces of the illuminated seat belt buckle and an annularly closed cover shell that covers distal end faces of the side walls, such that the cover shell forms an end face of the buckle housing, the cover shell having an opening for the actuating button and/or the insertion slot, and the light outlet opening being arranged in the cover shell, and
   wherein the cover shell is detachably connected to the side walls of the buckle housing.

2. The illuminated seat belt buckle according to claim 1, wherein the light outlet opening is formed by a light-diffusing element arranged in the cover shell.

3. The illuminated seat belt buckle according to claim 2, wherein the light-diffusing element and the cover shell are connected to each other in a form-fitting or integral manner.

4. The illuminated seat belt buckle according to claim 2, wherein the light-diffusing element and the cover shell are a single piece.

5. The illuminated seat belt buckle according to claim 1, wherein the at least one light source of the illuminating device is formed by at least one LED or an LED module.

6. The illuminated seat belt buckle according to claim 1, wherein the illuminating device includes a light conductor, which receives light emerging from the at least one light source and couples the light into the light outlet opening.

7. The illuminated seat belt buckle according to claim 6, wherein the light conductor and the at least one light source comprise a circuit board and at least one LED to form an integral structural unit.

8. The illuminated seat belt buckle according to claim 6, wherein the light conductor has an annularly closed ring section, which is arranged congruently with the light outlet opening.

9. The illuminated seat belt buckle according to claim 6, wherein the light conductor has a light-deflecting structure, at least in sections, on an underside facing away from the light outlet opening.

10. The illuminated seat belt buckle according to claim 9, wherein the light-deflecting structure is formed of multiple prisms.

11. The illuminated seat belt buckle according to claim 1, wherein the cover shell is formed of a material that is impermeable to light.

12. An illuminated seat belt buckle for a seat belt, the illuminated seat belt buckle comprising:
    a buckle housing;
    a locking mechanism;
    an insertion slot for a belt latch of the seat belt;
    an actuating button for releasing the illuminated seat belt buckle; and
    an illuminating device that has at least one light source and is arranged in the illuminated seat belt buckle,
    wherein the buckle housing has a light-permeable and annularly closed light outlet opening from which the coupled-in light provided by the illuminating device emerges and which circumferentially surrounds the actuating button and/or the insertion slot,
    wherein the illuminating device includes a light conductor, which receives light emerging from the at least one light source and couples the light into the light outlet opening,
    wherein the light conductor has an annularly closed ring section, which is arranged congruently with the light outlet opening,
    wherein the buckle housing includes a cover shell that forms and end face of the buckle housing, wherein the light outlet opening is arranged in the cover shell, the light outlet opening being formed by a light-diffusing element arranged in the cover shell, and
    wherein the ring section of the light conductor at least partially abuts a back side of the light-diffusing element facing away from a visible side and/or a back side of the cover shell facing away from the visible side.

13. The illuminated seat belt buckle according to claim 12, wherein the ring section of the light conductor is injection-molded onto the light-diffusing element or the cover shell.

14. An illuminated seat belt buckle for a seat belt, the illuminated seat belt buckle comprising:
    a buckle housing;
    a locking mechanism;
    an insertion slot for a belt latch of the seat belt;
    an actuating button for releasing the illuminated seat belt buckle; and
    an illuminating device that has at least one light source and is arranged in the illuminated seat belt buckle,
    wherein the buckle housing has a light-permeable and annularly closed light outlet opening from which the coupled-in light provided by the illuminating device emerges and which circumferentially surrounds the actuating button and/or the insertion slot,
    wherein the illuminating device includes a light conductor, which receives light emerging from the at least one light source and couples the light into the light outlet opening, and
    wherein a light-impermeable partition wall is provided, at least in sections, between the at least one light source and the locking mechanism and/or between the light conductor and the locking mechanism.

15. The illuminated seat belt buckle according to claim 14, wherein the at least one light source is arranged and fixed between the partition wall and the buckle housing, and wherein a ring section of the light conductor is arranged and fixed between the partition wall and a cover shell of the buckle housing.

16. The illuminated seat belt buckle according to claim 15, wherein the partition wall is connected to the cover shell or the buckle housing to form a single piece.

* * * * *